United States Patent
Monroe et al.

(10) Patent No.: US 7,428,368 B1
(45) Date of Patent: *Sep. 23, 2008

(54) MULTIFUNCTION REMOTE CONTROL SYSTEM FOR AUDIO AND VIDEO RECORDING, CAPTURE, TRANSMISSION AND PLAYBACK OF FULL MOTION AND STILL IMAGES

(76) Inventors: David A. Monroe, 740 Lincoln Center, 7800 IH 10 West, San Antonio, TX (US) 78230; Randall A. Hoeffer, 1114 Clipper Dr., Slidell, LA (US) 70458-5551; Stephen M. Baker, 2466 Rim Oak, San Antonio, TX (US) 78232; Michael A. Forman, 3915 Forest Creek, San Antonio, TX (US) 78230

( * ) Notice: Subject to any disclaimer, the term of this patent is extended or adjusted under 35 U.S.C. 154(b) by 18 days.

This patent is subject to a terminal disclaimer.

(21) Appl. No.: 11/288,636

(22) Filed: Nov. 29, 2005

Related U.S. Application Data

(63) Continuation of application No. 09/143,232, filed on Aug. 28, 1998, now abandoned.

(51) Int. Cl.
*H04N 7/00* (2006.01)
*H04N 5/00* (2006.01)
(52) U.S. Cl. .................. 386/46; 386/120
(58) Field of Classification Search .......... 386/46, 386/124, 120, 104, 121, 117, 107, 1, 4, 52, 386/38
See application file for complete search history.

(56) References Cited

U.S. PATENT DOCUMENTS

| | | | |
|---|---|---|---|
| 4,163,283 A | 7/1979 | Darby | |
| 4,179,695 A | 12/1979 | Levine et al. | |
| 4,197,536 A | 4/1980 | Levine | |
| 4,516,125 A | 5/1985 | Schwab et al. | |
| 4,831,438 A | 5/1989 | Bellman, Jr. et al. | |
| 4,845,629 A | 7/1989 | Murga | |
| 4,857,912 A | 8/1989 | Everett, Jr. et al. | |
| 4,891,650 A | 1/1990 | Sheffer | |
| 4,910,692 A | 3/1990 | Outram | |
| 5,027,104 A | 6/1991 | Reid | |
| 5,027,114 A | 6/1991 | Kawashima et al. | |

(Continued)

FOREIGN PATENT DOCUMENTS

EP         209397         1/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—Robert Chevalier

(57) ABSTRACT

A multifunction remote controlled video recording, transmission and playback system includes a still frame generator adapted for selecting and generating still frames on the fly while a full motion video signal is being recorded, without interrupting the recording function. Audio and data signals, such as cockpit audio in an aircraft and gps and telemetry signals may also be incorporated in the recorded full motion video recording on a real time synchronized basis. The still frames are digitally enhanced, producing a full field frame from the analog video signal. Still frames can be produced in single, burst and snap modes without interrupting the full motion video recording function.

17 Claims, 12 Drawing Sheets

U.S. PATENT DOCUMENTS

| | | |
|---|---|---|
| 5,091,780 A | 2/1992 | Pomerleau |
| 5,109,278 A | 4/1992 | Erickson |
| 5,111,291 A | 5/1992 | Erickson |
| 5,122,886 A * | 6/1992 | Tanaka ..................... 386/104 |
| 5,166,746 A | 11/1992 | Sato et al. |
| 5,218,367 A | 6/1993 | Sheffer et al. |
| 5,243,340 A | 9/1993 | Norman et al. |
| 5,243,530 A | 9/1993 | Stanifer et al. |
| 5,268,698 A | 12/1993 | Smith, Sr. et al. |
| 5,283,643 A | 2/1994 | Fujimoto |
| 5,321,615 A | 6/1994 | Frisbie et al. |
| 5,334,982 A | 8/1994 | Owen |
| 5,351,194 A | 9/1994 | Ross et al. |
| 5,400,031 A | 3/1995 | Fitts |
| 5,408,330 A | 4/1995 | Squicciarini et al. |
| 5,432,838 A | 7/1995 | Purchase |
| 5,440,337 A | 8/1995 | Henderson et al. |
| 5,440,343 A | 8/1995 | Parulski |
| 5,448,243 A | 9/1995 | Bethke et al. |
| 5,463,595 A | 10/1995 | Rodhall et al. |
| 5,469,371 A | 11/1995 | Bass |
| 5,497,149 A | 3/1996 | Fast |
| 5,508,736 A | 4/1996 | Cooper |
| 5,509,009 A | 4/1996 | Laycock |
| 5,530,440 A | 6/1996 | Danzer et al. |
| 5,553,609 A | 9/1996 | Chen et al. |
| 5,557,254 A | 9/1996 | Johnson et al. |
| 5,557,278 A | 9/1996 | Piccirillo et al. |
| 5,598,167 A | 1/1997 | Zijderhand |
| 5,612,668 A | 3/1997 | Scott |
| 5,627,753 A | 5/1997 | Brankin et al. |
| 5,629,691 A | 5/1997 | Jain |
| 5,636,122 A | 6/1997 | Shah et al. |
| 5,642,285 A | 6/1997 | Woo |
| 5,666,157 A | 9/1997 | Aviv |
| 5,670,961 A | 9/1997 | Tomita et al. |
| 5,677,979 A | 10/1997 | Squicciarini |
| 5,689,442 A | 11/1997 | Swanson |
| 5,712,679 A | 1/1998 | Coles |
| 5,712,899 A | 1/1998 | Pace, II |
| 5,714,948 A | 2/1998 | Farmakis et al. |
| 5,742,336 A | 4/1998 | Lee |
| 5,751,346 A | 5/1998 | Dozier |
| 5,761,369 A * | 6/1998 | Yoshimura et al. ............ 386/46 |
| 5,777,551 A | 7/1998 | Hess |
| 5,777,580 A | 7/1998 | Janky et al. |
| 5,793,416 A | 8/1998 | Rostoker et al. |
| 5,825,283 A | 10/1998 | Camhi |
| 5,835,059 A | 11/1998 | Nadel et al. |
| 5,850,180 A | 12/1998 | Hess |
| 5,867,804 A | 2/1999 | Pilley et al. |
| 5,917,405 A | 6/1999 | Joao |
| 5,926,210 A | 7/1999 | Hackett et al. |
| 5,933,098 A | 8/1999 | Haxton |
| 5,938,706 A | 8/1999 | Feldman |
| 5,974,158 A | 10/1999 | Auty et al. |
| 5,983,161 A | 11/1999 | Lemelson et al. |
| 5,999,116 A | 12/1999 | Evers |
| 6,002,427 A | 12/1999 | Kipust |
| 6,009,356 A | 12/1999 | Monroe |
| 6,067,571 A | 5/2000 | Igarashi et al. |
| 6,069,655 A | 5/2000 | Seeley |
| 6,078,850 A | 6/2000 | Kane et al. |
| 6,084,510 A | 7/2000 | Lemelson et al. |
| 6,092,008 A | 7/2000 | Bateman |
| 6,100,964 A | 8/2000 | De Cremiers |
| 6,133,941 A | 10/2000 | Ono |
| 6,154,658 A | 11/2000 | Caci |
| 6,157,317 A | 12/2000 | Walker |
| 6,181,373 B1 | 1/2001 | Coles |
| 6,195,609 B1 | 2/2001 | Pilley et al. |
| 6,226,031 B1 | 5/2001 | Barraclough et al. |
| 6,246,320 B1 | 6/2001 | Monroe |
| 6,259,475 B1 | 7/2001 | Ramachandran et al. |
| 6,275,231 B1 | 8/2001 | Obradovich |
| 6,278,965 B1 | 8/2001 | Glass et al. |
| 6,282,488 B1 | 8/2001 | Castor et al. |
| 6,292,098 B1 | 9/2001 | Ebata |
| 6,356,625 B1 | 3/2002 | Castelani |
| 6,385,772 B1 | 5/2002 | Courtney |
| 6,424,370 B1 | 7/2002 | Courtney |
| 6,462,697 B1 | 10/2002 | Klamer et al. |
| 6,476,858 B1 | 11/2002 | Ramirez Diaz et al. |
| 6,504,479 B1 | 1/2003 | Lemons |
| 6,522,532 B2 | 2/2003 | Liao et al. |
| 6,525,761 B2 | 2/2003 | Sato et al. |
| 6,549,130 B1 | 4/2003 | Joao |
| 6,556,241 B1 | 4/2003 | Yoshimura et al. |
| 6,570,610 B1 | 5/2003 | Kipust |
| 6,628,835 B1 | 9/2003 | Brill |
| 6,646,676 B1 | 11/2003 | DaGraca |
| 6,662,649 B1 | 12/2003 | Knight et al. |
| 6,675,386 B1 | 1/2004 | Hendricks et al. |
| 6,698,021 B1 | 2/2004 | Amini |
| 6,720,990 B1 | 4/2004 | Walker et al. |
| 7,113,971 B1 | 9/2006 | Ohi et al. |
| 2003/0071699 A1 | 4/2003 | Joao |
| 2005/0055727 A1 | 3/2005 | Creamer et al. |
| 2005/0138083 A1 | 6/2005 | Rastegar |

FOREIGN PATENT DOCUMENTS

| | | |
|---|---|---|
| EP | 220752 | 5/1987 |
| EP | 232031 | 8/1987 |
| EP | 532110 | 3/1993 |
| EP | 613109 | 8/1994 |
| EP | 613110 | 8/1994 |
| EP | 613111 | 8/1994 |
| EP | 744630 | 11/1996 |
| EP | 785536 | 7/1997 |
| JP | 6-301898 | 10/1994 |
| JP | 9-251599 | 9/1997 |
| JP | 9-282600 | 10/1997 |
| JP | 11-160424 | 6/1999 |
| WO | WO90/04242 | 4/1990 |
| WO | WO95/27910 | 10/1995 |
| WO | WO96/12265 | 4/1996 |
| WO | WO97/23096 | 6/1997 |
| WO | WO97/37336 | 10/1997 |
| WO | WO98/52174 | 11/1998 |
| WO | WO00/36807 | 6/2000 |

OTHER PUBLICATIONS

Nov. 24, 1997, TELEXIS ViaNet General Information Booklet Version 1.3.

2000, ViaNet 3000 Administrator's Manual Version 1.1-NetXpress Video by TELEXIS, Kanata, Ontario, Canada.

1999, ViaNet 3000 Operator Manual Version 1.0 by TELEXIS-NetXpress Video, Kanata, Ontario, Canada.

1999, ViaNet 3000 Administrator Manual Version 1.0-NetXpress Video by TELEXIS, Kanata, Ontario, Canada.

1999, ViaNet 3000 Instruction Manual Operator's Revision 1-NetXpress Video by TELEXIS, Kanata, Ontario, Canada.

Apr. 1966, Apollo Unified S-Band System, NASA-Goddard Space Flight Center, Greenbelt, Maryland.

Nov. 24, 1976, TELEXIS ViaNet General Information Booklet Version 1.3.

2000, ViaNet 3000 Administrator's Manual Version 1.1-NetXpress Video by TELEXIS, Kanata, Ontario, Canada.

1999 Vianet 3000 Operator Manual Version 1.0 - NetXpress Video by TELEXIS, Kanata, Ontario, Canada.

1999 ViaNet 3000 Administrator Manual Version 1.0 - NetXpress Video by TELEXIS, Kanata, Ontario, Canada.

1999 ViaNet 3000 Instruction Manual Operator's Revision 1 - NetXpress Video by TELEXIS, Kanata, Ontario, Canada.

* cited by examiner

TOP LEVEL MENU REFLECTING THE RECORDER STATE — 202
180 (RECORD) — 204

| S | = | X | X | X |   | H | = | X | X | X |   | R | = | X | X | X |   |   | R | : | X | X | X |
|---|---|---|---|---|---|---|---|---|---|---|---|---|---|---|---|---|---|---|---|---|---|---|---|
| B | r | s | t |   | S | n | a | p |   | S | e | t | V | i | e | w | D | a | t | a |   |   |   |

182 (PLAY) — 206

| S | = | X | X | X |   | H | = | X | X | X |   | R | = | X | X | X |   |   | P | : | X | X | X |
|---|---|---|---|---|---|---|---|---|---|---|---|---|---|---|---|---|---|---|---|---|---|---|---|
| B | r | s | t |   | S | n | a | p |   | S | e | t | V | i | e | w | D | a | t | a |   |   |   |

(STANDBY) — 208

| S | = | X | X | X |   | H | = | X | X | X |   | R | = | X | X | X |   |   | S | : | X | X | X |
|---|---|---|---|---|---|---|---|---|---|---|---|---|---|---|---|---|---|---|---|---|---|---|---|
| B | r | s | t |   | S | n | a | p |   | S | e | t | V | i | e | w | D | a | t | a |   |   |   |

(UNTHREAD) — 210

| S | = | X | X | X |   | H | = | X | X | X |   | R | = | X | X | X |   |   | U | : | X | X | X |
|---|---|---|---|---|---|---|---|---|---|---|---|---|---|---|---|---|---|---|---|---|---|---|---|
| B | r | s | t |   | S | n | a | p |   | S | e | t | V | i | e | w | D | a | t | a |   |   |   |

NEXT MENU LEVEL AFTER PRESSING VIEW

| S | = | X | X | X |   | H | = | X | X | X |   | R | = | X | X | X |   |   | R | : | X | X | X |
|---|---|---|---|---|---|---|---|---|---|---|---|---|---|---|---|---|---|---|---|---|---|---|---|
| E | n | d |   | D | u | m | p | S | e | n | d | H | o | l | d | R | c | v |   |   | V | T | R |

NEXT MENU LEVEL AFTER PRESSING VTR
DISPLAY IF STBY IS SELECTED

| S | T | A | N | D | B | Y |   |   |   |   |   |   |   | X | X | : | X | X | : | X | X |
|---|---|---|---|---|---|---|---|---|---|---|---|---|---|---|---|---|---|---|---|---|---|
| E | n | d |   | S | e | t |   | S | t | b | y | R | e | c |   | U | n | t | h | R | s | e | t |

DISPLAY IF REC IS SELECTED

| R | E | C | O | R | D |   |   |   |   |   |   |   |   | X | X | : | X | X | : | X | X |
|---|---|---|---|---|---|---|---|---|---|---|---|---|---|---|---|---|---|---|---|---|---|
| E | n | d |   | S | e | t |   | S | t | b | y | R | e | c |   | U | n | t | h |   | E | M | K |

DISPLAY IF UNTH IS SELECTED

| U | N | T | H | R | E | A | D |   |   |   |   |   |   | X | X | : | X | X | : | X | X |
|---|---|---|---|---|---|---|---|---|---|---|---|---|---|---|---|---|---|---|---|---|---|
| E | n | d |   | S | e | t |   | S | t | b | y | R | e | c |   | U | n | t | h | R | s | e | t |

PRESSING EMK WHILE RECORDING ADDS AN EVENT MARK ON THE TAPE FOR SEARCHING PURPOSES
(EMK REPLACES RSET WHILE RECORDING)

| R | E | C | O | R | D |   |   |   |   |   |   |   |   | X | X | : | X | X | : | X | X |
|---|---|---|---|---|---|---|---|---|---|---|---|---|---|---|---|---|---|---|---|---|---|
| E | n | d |   | S | e | t |   | R | e | c |   | S | t | b | y | U | n | t | h |   | E | M | K |

RSET RESETS TAPE COUNTER IN UPPER LEVEL MENU AND THIS LEVEL

|   |   |   |   |   |   |   |   |   |   |   |   |   |   | X | X | : | X | X | : | X | X |
|---|---|---|---|---|---|---|---|---|---|---|---|---|---|---|---|---|---|---|---|---|---|
| E | n | d |   | S | e | t |   | S | t | b | y | R | e | c |   | U | n | t | h | R | s | e | t |

PRESSING SET MOVES TO THE NEXT MENU LEVEL

|   |   |   |   |   |   |   |   |   |   |   |   |   |   | X | X | : | X | X | : | X | X |
|---|---|---|---|---|---|---|---|---|---|---|---|---|---|---|---|---|---|---|---|---|---|
| E | n | d |   | S | e | t |   | S | t | b | y | R | e | c |   | U | n | t | h | R | s | e | t |

FIG. 10a

DISPLAY IF PLAY IS SELECTED

| P | L | A | Y |   |   |   |   |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

DISPLAY IF REW IS SELECTED

| R | E | W | I | N | D |   |   |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

DISPLAY IF FF IS SELECTED

| F | – | F | W | D |   |   |   |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

DISPLAY IF RECORDER IS IN THE PLAY MODE AND FF IS SELECTED

| S | C | A | N |   | F | O | R | W | A | R | D |   | X | X | : | X | X | : | X | X |
|---|---|---|---|---|---|---|---|---|---|---|---|---|---|---|---|---|---|---|---|---|
| E | n | d |   | B | a | c | k | S | t | i | l | P | l | a | y | R | E | W |   | F | F |

DISPLAY IF RECORDER IS IN THE PLAY MODE AND REW IS SELECTED

| S | C | A | N |   | R | E | V | E | R | S | E |   | X | X | : | X | X | : | X | X |
|---|---|---|---|---|---|---|---|---|---|---|---|---|---|---|---|---|---|---|---|---|
| E | n | d |   | B | a | c | k | S | t | i | l | P | l | a | y | R | E | W |   | F | F |

PRESSING BACK FROM THE STIL, PLAY, REW, FF MENU RETURNS YOU TO THE STBY, REC, UNTH, RSET MENU

| P | L | A | Y |   |   |   |   |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

OTHER POSSIBLE MENU PAGES AT THIS LEVEL

| R | E | C | O | R | D |   |   |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

| U | N | T | H | R | E | A | D |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

INDICATES END OF TAPE CONDITION

| E | O | T |   |   |   |   |   |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

INDICATES BEGINNING OF TAPE CONDITION

| B | O | T |   |   |   |   |   |   |   |   | X | X | : | X | X | : | X | X |
|---|---|---|---|---|---|---|---|---|---|---|---|---|---|---|---|---|---|---|
| E | n | d |   | B | a | c | k | S | t | i | l | P | l | a | y | R | E | W |   | F | F |

INDICATES AN INTERNAL ERROR CONDITION

| I | N | T | E | R | N | A | L |   | E | R | R | O | R |   | X | X | : | X | X | : | X | X |
|---|---|---|---|---|---|---|---|---|---|---|---|---|---|---|---|---|---|---|---|---|---|---|
| E | n | d |   | B | a | c | k | S | t | i | l | P | l | a | y | R | E | W |   | F | F |

FIG. 10b

INDICATES A COMMAND ERROR CONDITION

| C | O | M | M | A | N | D |   | E | R | R | O | R |   |   |   | X | X | : | X | X | : | X | X |
|---|---|---|---|---|---|---|---|---|---|---|---|---|---|---|---|---|---|---|---|---|---|---|---|
| E | n | d |   | B | a | c | k | S | t | i | l | l | P | l | a | y |   | R | E | W |   | F | F |

INDICATES A COMMS ERROR CONDITION BETWEEN THE ATR AND RECORDER

| C | O | M | M | S |   | E | R | R | O | R |   |   |   |   |   | X | X | : | X | X | : | X | X |
|---|---|---|---|---|---|---|---|---|---|---|---|---|---|---|---|---|---|---|---|---|---|---|---|
| E | n | d |   | B | a | c | k | S | t | i | l | l | P | l | a | y |   | R | E | W |   | F | F |

PRESSING BACK IN ANY OF THE ABOVE RETURNS YOU TO THE PREVIOUS PAGE

| C | O | M | M | S |   | E | R | R | O | R |   |   |   |   |   | X | X | : | X | X | : | X | X |
|---|---|---|---|---|---|---|---|---|---|---|---|---|---|---|---|---|---|---|---|---|---|---|---|
| E | n | d |   | B | a | c | k | S | t | i | l | l | P | l | a | y |   | R | E | W |   | F | F |

INDICATES CONDENSATION IN RECORDER

| D | E | W |   |   |   |   |   |   |   |   |   |   |   |   |   | X | X | : | X | X | : | X | X |
|---|---|---|---|---|---|---|---|---|---|---|---|---|---|---|---|---|---|---|---|---|---|---|---|
| E | n | d |   | B | a | c | k | S | t | i | l | l | P | l | a | y |   | R | E | W |   | F | F |

FIG. 10c

MULTIFUNCTION REMOTE CONTROL SYSTEM FOR AUDIO AND VIDEO RECORDING, CAPTURE, TRANSMISSION AND PLAYBACK OF FULL MOTION AND STILL IMAGES

CROSS REFERENCE TO RELATED APPLICATIONS

This application is a continuation of Ser. No. 09/143,232, filed on Aug. 28, 1998 now abandoned entitled: Multifunction Remote Control System For Audio Recording, Capture, Transmission And Playback Of Full Motion And Still Images, now allowed.

BACKGROUND OF INVENTION

1. Field of Invention

The invention is generally related to audio and video recording and playback systems for aircraft and is specifically directed to a single, multifunction control unit for recording, transmission and playback of both audio and video signals.

2. Discussion of the Prior Art

Recording systems have been used on board aircraft for many years. In the military, many aircraft such as, by way of example, the U.S. Navy F-14 Tomcat, have included recorders that permit the pilot to selectively record video images by activating the recorder. These systems also permit the images to be played back for viewing in a cockpit monitor by the pilot while in flight or, selectively, permit transmission of the images to a ship or ground station. The images are typically input from a video sensing device located in the aircraft and also controlled by the pilot.

Over the last several years a need has developed for better image recording, capture, playback and transmission techniques on board these aircraft. The current systems, such as, by way of example, the TEAC V1000 Video Tape Recorders (VTRs), only permit twenty minute or less recording capability and must be scrolled in order to find specific images in the recording.

Further, if a specific image is to be displayed as a still frame on the cockpit monitor, the recorder is stopped and live images cannot be recorded by the video during this interruption.

It is also desirable that the recording system be expanded to include cockpit audio, telemetry signals, GPS (Global Positioning System) signals and other data signals available for monitoring the performance of the aircraft and for increasing the amount of information associated with the video signals.

SUMMARY OF THE INVENTION

The multifunction remote control system of the subject invention is specifically directed to an enhanced video recording, transmission and playback system for aircraft. The system is capable of not only recording, transmitting and playing back video images but is also adapted for recording, transmitting and playing back audio, telemetry, GPS and other data signal in synchronization with the video signal. One important unique feature of the invention is the incorporation of a single, multifunction remote control unit for controlling all the recording, capture, transmission and playback functions at the fingertips of the pilot.

The system of the subject invention utilizes a digital image capture system capable of operating as a recorder and playback unit as well as a transmission system for transmitting full motion, selected still frame and combined full motion and still frame video images to an on board monitor or to a ship or shore station. One of the important features of the invention is the capability to capture and transmit a still image on the fly while the recorder is still functioning. This is made possible by incorporating a digital image capture device that receives and captures the images being entered on the recording medium without interfering with the recording function. This also allows for better quality still images by permitting the capture and transmission of a full frame video image instead of the partial frame, single field still images of the prior art.

In operation, the recorder may be paused in typical fashion in order to view a single frame. As with prior art systems, this will pause the recording function and the single still frame be a typical analog frame with a partial field image, often including the typical tearing which is a standard paused playback artifact. However, if the specific image is desired to be captured and transmitted, the operator (or pilot) will select the capture mode and the system will back up a preselected number of frames and then forward through the selected still in order to digitally capture the selected image as a full frame image. This eliminates the fuzzy quality of single field images and eliminates the tearing, as well, resulting in a more reliable, sharper image for monitoring on site or for transmission to a remote location.

The system also permits on the fly capture of still frames without interrupting the recording cycle. In both the record and pause modes and the record and capture mode, the resulting captured signal is a sharp, full field (or full resolution) signal with a minimum of noise.

Another important feature of the invention is the capability for "marking" the recorded medium for later selecting, and capturing selected stills. During the recording mode, this marking function permits selection for later seek and capture either during later playback after completion of a mission, or during the mission directly in the cockpit, using the cockpit monitor. When the media is in the playback mode, the "marked" stills may be either automatically captured and stored and/or transmitted as full frame digital stills, or the system may be used to manually scroll through the recording one-by-one or automatically scroll through all of the selected, marked stills for sequential viewing/and or transmission. This capability is particularly useful for verification of visual data, such as, by way of example, the visual verification of a target by a ship or shore station.

Another important feature of the invention is the automatic "reset" feature, where the beginning of each mission is marked on the recording medium and the counter point is noted or reset to zero. This permits ready identification of the beginning and end of each mission and permits the operator or pilot to automatically return to the beginning of each mission to review the recorded images and data without searching for the start point.

The digital capture capability of the subject invention permits continuous real time recording of video and other data while simultaneously permitting the pilot or other operator to select a "freeze" frame, permitting close analysis of a specific view without interrupting the recording process. The recorder/playback systems of the prior art require interruption of the recording process during a freeze-frame or pause mode. One important aspect of this feature is the ability to not only view the select "freeze" frame, but also to capture, store and/or transmit the frame to a remote station.

The versatility of the system of the subject invention permits transmission of the full motion image both in real time, or as a played back recording, as well as still frames of selected images and burst modes. The burst mode is a selection of sequential still images over a selected time frame. For example, assuming a target is identified and destroyed, it may be desirable to select a sequential series of still images at specific timed intervals, e.g. every one-fourth of a second, for five seconds before and twenty seconds after destruction, while at the same time simultaneously recording the full image on tape without interruption. The burst mode is more fully described in my co-pending application entitled: Video and Data Capture and Retrieval Surveillance System for Aircraft, Ser. No. 08/729,139, filed on Oct. 11, 1996; Acoustic Catastrophic Detection and Data Capture and Retrieval System for Aircraft; Ser. No. 08/738,487, filed on Oct. 28, 1996 and Wireless Transducer Data Capture and Retrieval System for Aircraft, Ser. No. 08/745,536, filed on Nov. 12, 1996 and incorporated by reference herein.

One advantage of the system of the present invention is the capability for recording not only video signals but also cockpit audio and telemetry, GPS and other data signal as well, in a real time, synchronized relationship with the video image. The data signals are displayed in alphanumeric symbols with the video image in both the full motion and still frame mode. The audio portion is recorded for playback and transmission in the full motion mode. The data signals can be used as part of the marking function. For example, specific still frame images could be selected based on GPS data for capture and storage, as well as for transmission.

One of the most significant advantages of the subject invention is the inclusion of all the functional and operating controls in a single remote control unit easily accessed by the pilot in the cockpit. This permits easy access and control of the system during flight, permitting full use of the multifunction capability of the system. In the preferred embodiment, Phototelesis ATR-403WB and RCU-403 capture and transmission modules are combined with a TEAC HI 8 V80 VTR recorder/playback unit. This can be activated during both the recording mode and the playback mode. These components are combined and programmed with the novel features of the subject invention to provide the versatile, multifunction system. The single, multifunction remote control unit is then utilized to not only control the recorder record and pause and playback function but also to control the select, capture and transmit functions of the processor.

It is, therefore, an object and feature of the subject invention to provide for a versatile, accessible, multifunction recording and playback system for recording video images on board an aircraft during flight.

It is also an object and feature of the subject invention to provide for a single, multifunction control unit for controlling all recording, selection and capturing, transmission and playback functions of the system.

It is another object and feature of the subject invention to provide for a combination video, audio and data recorder having a single remote control unit for controlling all of the functions from a single control unit.

It is yet another object and feature of the subject invention to provide for a multi-media recording, transmission and playback system which is capable of selecting, displaying, storing and transmitting still full field still frame images without interruption of the real time recording of full motion images.

It is also an object and feature of the subject invention to permit marking of selected stills, bursts or sections of full motion image segments via operator controlled selection, or selection based on predefined criteria such as time sequencing, GPS data or other.

Other objects and features of the invention will be readily apparent from the accompanying drawing and detailed description of the preferred embodiment.

BRIEF DESCRIPTION OF THE DRAWINGS

FIGS. 10a, 10b and 10c are an expanded menu readout display, showing the alphanumeric display for each of the menu selections of FIG. 9.

DETAILED DESCRIPTION OF THE PREFERRED EMBODIMENTS

Figure 1:
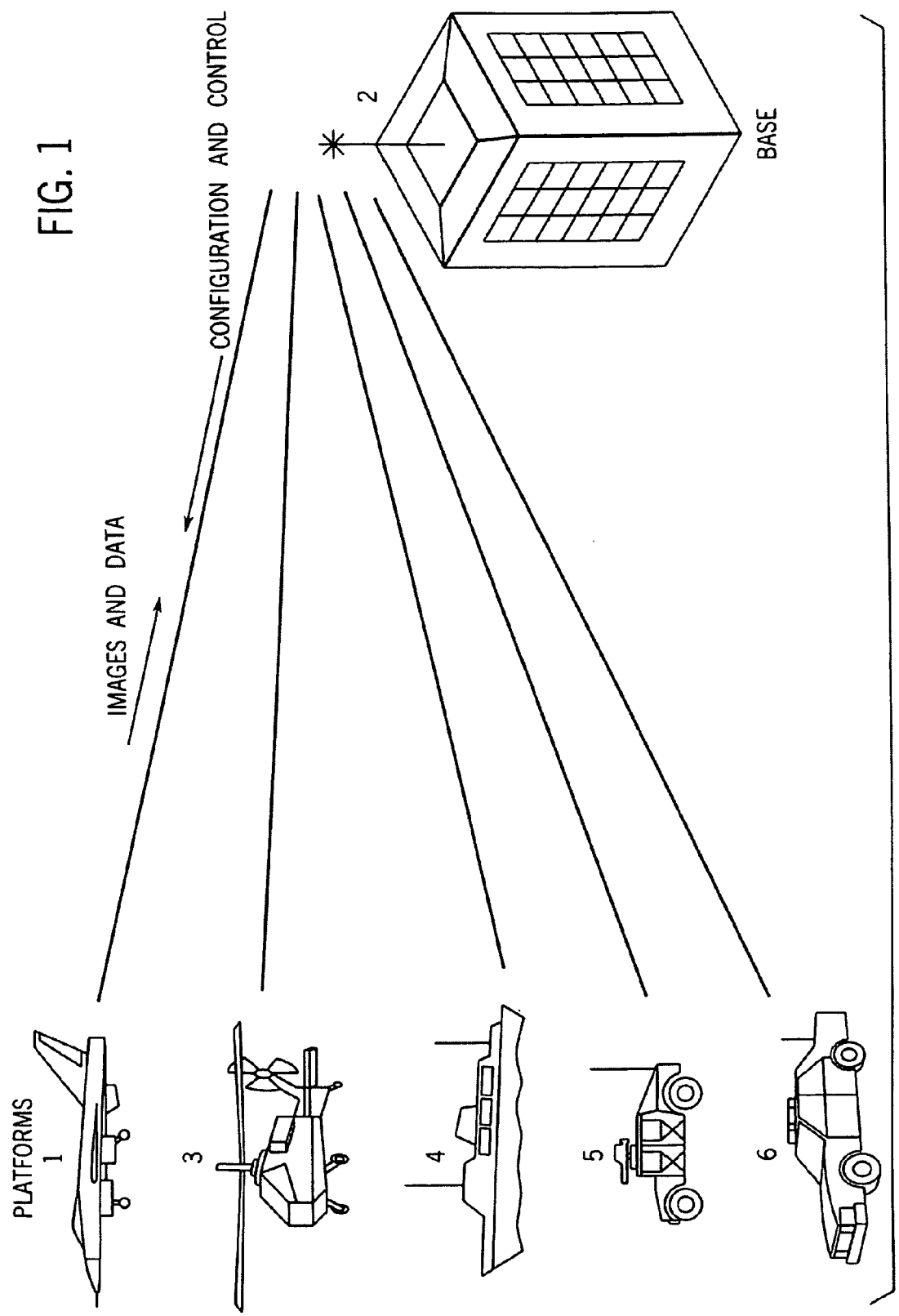
FIG. 1 is an overview of some of the platform configurations for which the system of the subject invention is suited.

A system overview is shown in FIG. 1. The system is adapted for use in any type of platform permitting not only the recording, capture, transmission and playback of video information, but also the mating of data signals and audio signal with the video information. The platform used as an example throughout this disclosure is a fixed wing military aircraft 1, such as, by way of example, the Navy F-14 Tomcat. The multi-function system of the subject invention 30 permits data to be used on board the aircraft, as well as transmission and receipt of data between a remote station such as a ship or ground based station 2. Images and data can be downlinked directly to the base station and configuration and control data and signals uplinked to the aircraft via radio transmission. The system of the present invention also accommodates air-to-air transmissions, as between the fixed wing aircraft I and the rotary winged aircraft 3, or air-to-sea transmissions, as between the fixed wing aircraft 1 and the marine vessel 4, or to ground as with the fixed winged aircraft 1 and the military vehicle 5 or the civilian vehicle 6. Any of a variety of combinations is possible. While the following description is directed primarily to communication between fixed wing aircraft and a ship or ground based system, it should be understood that the invention encompasses any combination of base and object stations or units.

Figure 2:
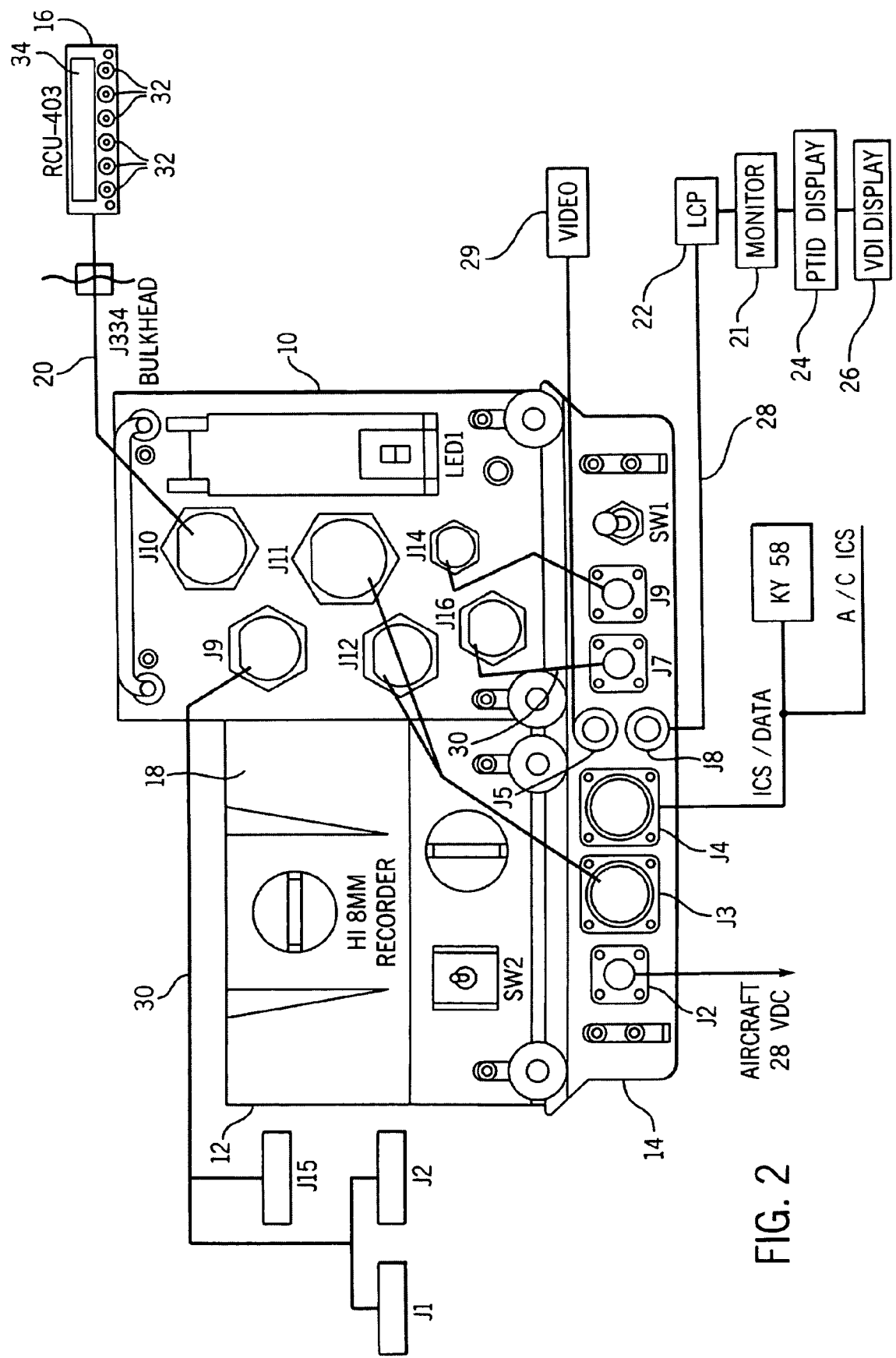
FIG. 2 is a system interface diagram.

As shown in FIG. 2, the system of the subject invention comprises a central processor unit 10, a recorder/playback unit 12, a base or interface unit 14 and a multifunction, single remote control unit 16. In the preferred embodiment, the central processing unit 10 is a Phototelesis A72-403WB and the remote control unit 16 is a Phototelesis RCU-403WB. The recorder/playback unit 12 is a TEAC HI 8 V80 VTR system. The access door 18 provides access to the HI 8 V80 tape cassette which is capable of up to two full hours of real time recording.

The remote control unit 16 is connected to the central processor 10 at connector J10 via cable 20. Wireless remotes may also be incorporated in the system without departing from the scope and spirit of the invention. A 28VDC power signal is provided via a cable connection at the J2 connector in the interface unit 14. The monitor system 21 comprises the 22 Lanterin control Panel (optional), the PTID display 24 and the VDI display 26. These are connected to the system via cable system 28 at connector J4 in the interface unit. An ICS/DATA signal is connected via connector J3. The TCS video module 29, the video source, is connected via connector J5. The 28VDC power signal is transmitted from the interface unit 14 to the central processor 10 via a cable system 30 between connectors J7 and J13. Communication and control signals are transmitted between the central processor and the interface unit via cables connected to connector J3 in the interface unit and connector ill and J12 in the processor unit. The main power switch is SW1 in the interface unit. The recorder/playback unit 12 is connected to the central processor via a cable system 30 between connectors J1 and J2 on the recorder playback unit, J15 on the Interface unit and connector J9 on the processing unit 10. A signal light LED 1 is provided on the central processor to indicate that the processor is powered and operational.

Once the system is powered up, all of the functions are controlled by the single remote control unit 16 which includes a plurality of function buttons 32 and an alphanumeric display panel 34.

Figure 3:
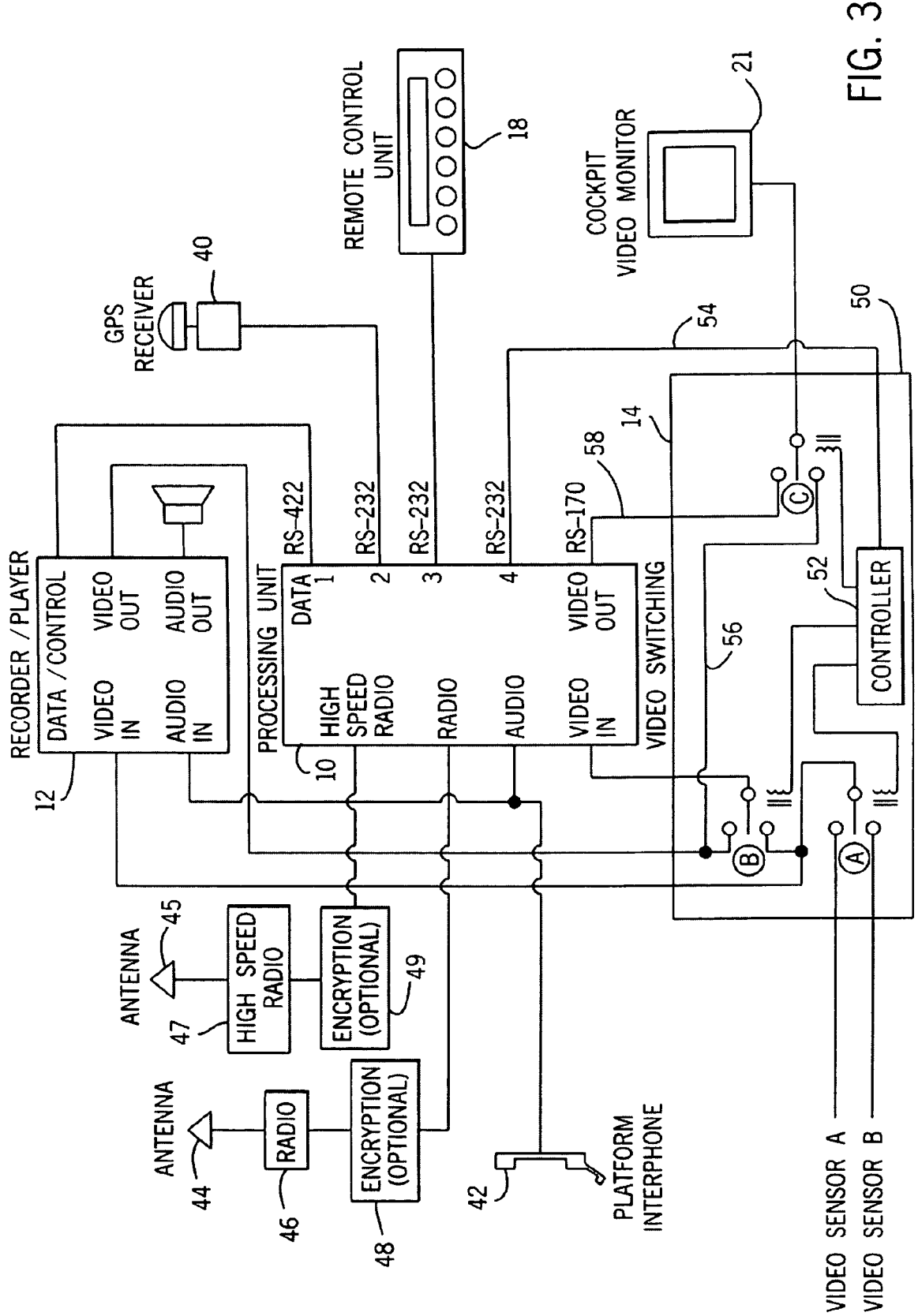
FIG. 3 is a more detailed diagram of a system having the components as shown in FIG. 2.

As shown in more detail in FIG. 3, the system of the subject invention is adapted for interfacing with a telemetry and GPS data, as indicated by the GPS receiver 40 and the aircraft interphone 42. In a standard application, the central processing unit can transmit and receive radio signals from a ship, ground or other aircraft radio via antenna 44, radio link 46 and, where desired, an encryption unit 48.

The video switching module 50 is housed in the interface unit 14. Switch A in the video switching module 50 permits selection between any of a plurality of video sensors such as video sensors A and B, as shown. These may be manually selected via the remote control unit 16, or programmed selection may be utilized as programmed at the central processing unit 10. A controller module 52 receives the control and selection signal input on the data line 54 which is an RS-232 data line connected to data port 4 of the central processing unit. The processor video input select switch B is also provided in the video switching module and is controlled by the controller 52 and selects the sensor sources or the recorder/player output for capture/processing/storage/transmission. A display monitor input select switch C is also provided for selecting either the recorder/player unit output on line 56 or the processing unit output on line 58.

As shown in FIG. 3, the data signals from the GPS receiver and other data signal are introduced into the processor 10 for conditioning and input for recording at the data/control port of the recorder/player 12 and permit for digital storage, and transmission. This permits the data signals to be recorded in simultaneous, real-time mode with the video signals input from the video sensors A and B. The audio signal from the interphone 42 is also input to the processor 10 and the recorder/player unit 12 for real time, synchronized recording.

An optional high speed radio link 47, may also be provided to support full motion transmission capability and is linked to the high speed radio port of the processing unit 10 through the optional encryption unit 49. The antenna 45 permits downlinking to a base station via wireless radio. This high speed full motion capability could be incorporated in any of the various configurations of the invention. Compression of the video signal with a compressor algorithm such as MPEG 1 is desirable.

Figure 4:
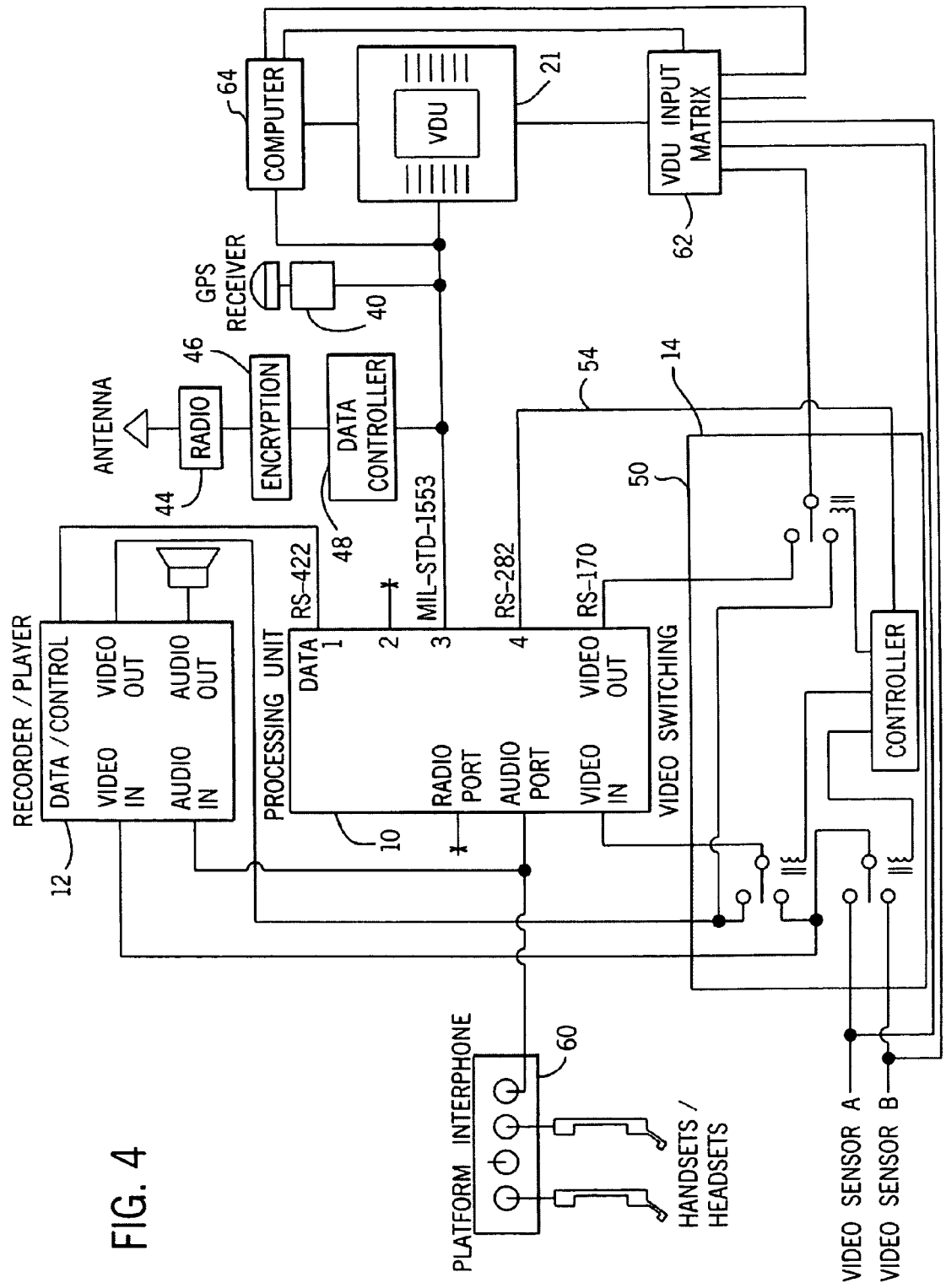
FIG. 4 is an alternative embodiment incorporating an MIL-ST-1553 data bus.

An alternative embodiment is shown in FIG. 4 and incorporates an MIL-STD-1553 data bus for connecting the display 21, the GPS and/or other data signal modules 40 and the radio and data controller 48 to the system. The radio interphone system 60 is also expanded to include additional audio channels. A VDU input matrix module 62 is provided for controlling the various video input signals to the cockpit integrated display 21. This is controlled by the platform controller computer 70 which is also connected to the display 21 and the processor unit 10 by the MIL-STD1553 data bus.

The 1553 bus is one common standard for interconnection of a plurality of data devices on military airborne or ground platforms. It is the equivalent of a local area network (or LAN). Other networking devices can be utilized without departing from the scope and spirit of the invention. Many different sensors and data signal generators may be connect to the 1553 bus, and data may be fused with imagery for recording, digital storage or transmission. Examples of sensors that may be utilized in connection with the subject invention and communicate and interact of the 1553 bus are: GPS receivers, magnetic compass system, laser range finders, a time source, the aircraft altimeter, and FLIR data, azimuth, range and location sensors. This greatly expands the versatility of the recording, capturing, transmission and playback capabilities of the system of the subject invention.

Data received by the 1553 bus may be processed and stored digitally with the processing unit 10, or may be encoded and stored on the recorder/player unit 12, or both. This allows for the capture and retrieval of a wide variety of real time mission data in connection with the mission video signals. The control of the processing unit 10 and the recorder/player unit 12 can be accomplished from the integrated VDU/key unit and the platform control computer over the 1553 bus. Digital data, such as video, audio, telemetry data, control commands, and the like may be communicated between the processing unit and the radio link (at 48) over the 1553 bus. In this mariner, control commands can be transmitted from a remote station to the platform by using the common data link available to the platform.

Figure 5:
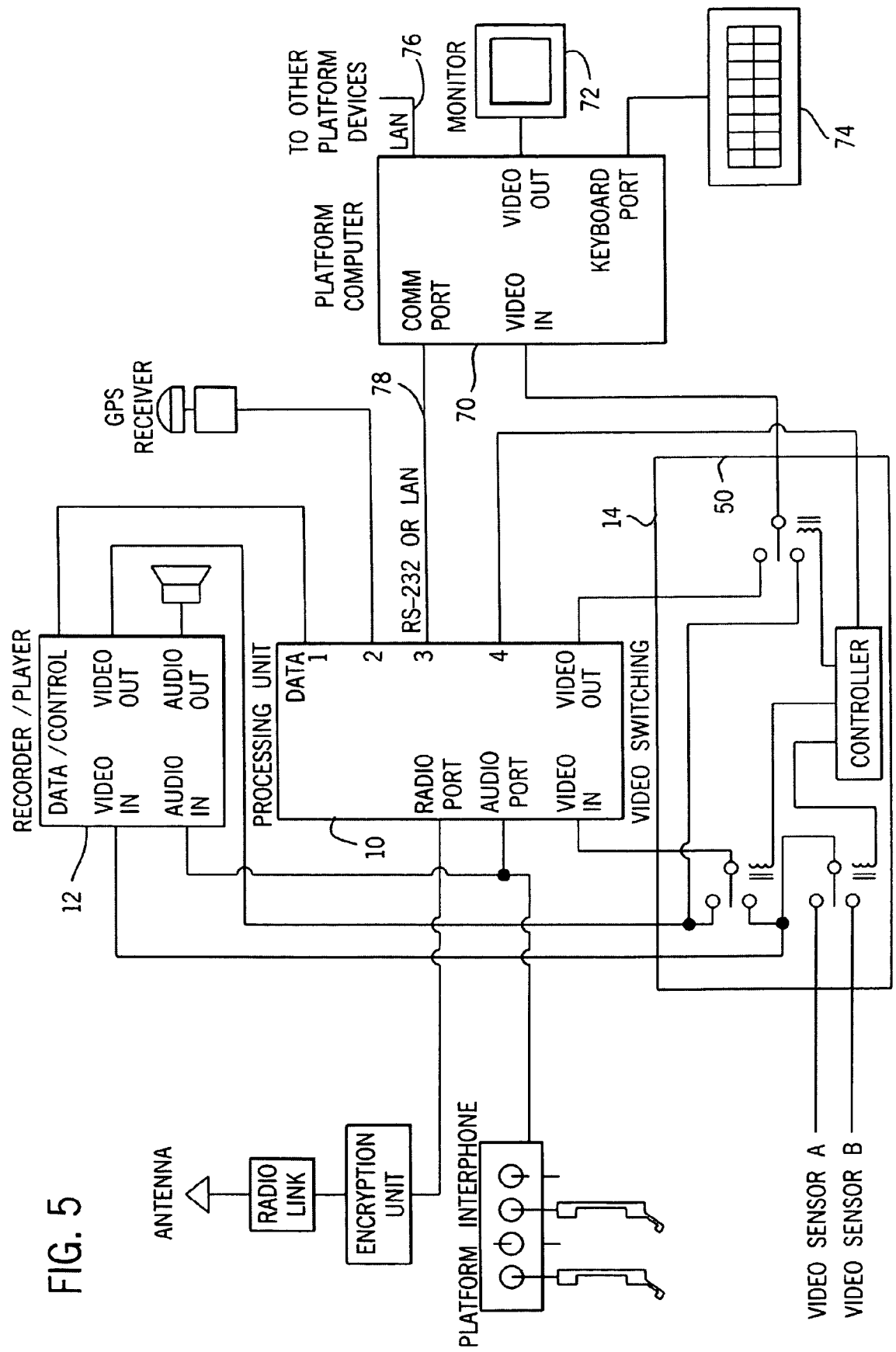
FIG. 5 is an alternative embodiment incorporating a platform computer associated with the system of the subject invention.

Another embodiment of the subject invention is shown if FIG. 5. In this embodiment, the various components and data entry devices correspond to those shown in FIGS. 3 and 4. However, a platform computer 70 has been incorporated to illustrate the adaptability of the device to vehicles having a conventional PC (personal computer) or a platform specific computer capability. In this configuration, the multifunction system of the subject invention may be controlled via the platform computer. Video is displayed on the computer VDU 72 by digitizing the video and merging it with the computer generated video in a display window. In addition, a window is provided for the commands of the system, replacing the remote control unit 16. The communication connection 78 between the processing unit 10 and the platform computer 70 may be an RS-232 cable, a LAN connection such as Ethernet MM-STD-1553, or any other data communications link. Other platform data, such as data from other sensors and computers, can be linked into the system from a LAN 76 or other direct communication connections. The computer keyboard 74 permits direct command and data entry into the platform computer. A mouse input device or other similar input means could also be used.

Figure 6:
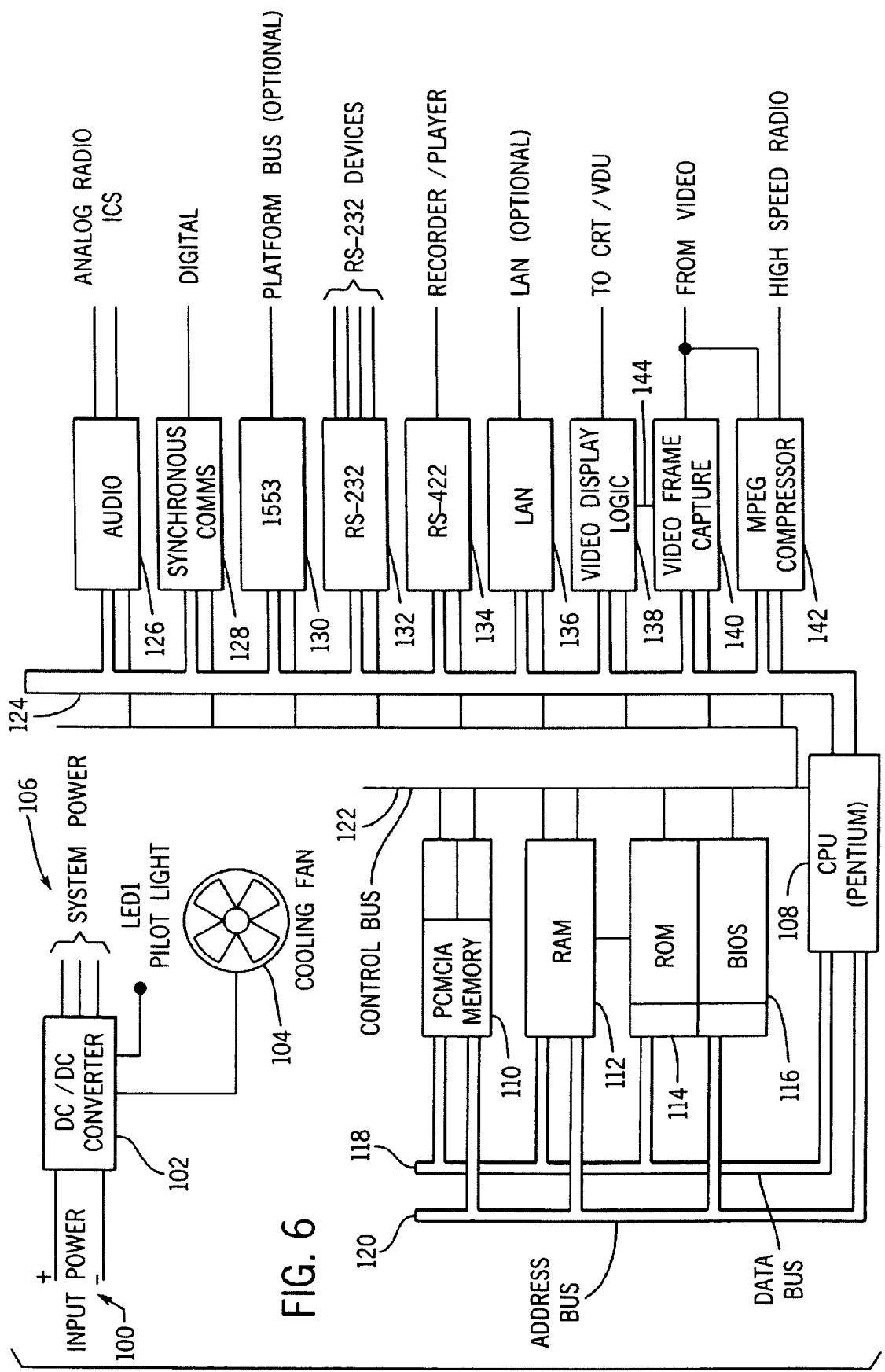
FIG. 6 is a block diagram of central processing unit of the system.

A block diagram of the basic components of the central processing unit 10 is shown in FIG. 6. A remote 28VPC power source is connected as shown in FIG. 2 and as indicated at 100. This is introduced into a DC/DC convertor 102 for powering the cooling fan 104 and providing system power at 106. When power is on, the pilot light LED 1 is illuminated. The heart of the processor 10 is a Pentium class CPU 108, which is connected to a PCMCIA memory card 110, RAM memory 112 and ROM memory 114, as well as the BIOS system 116 via an address bus 118 and a data bus 120. The CPU 108 controls the PCMIA, RAM, ROM and BIOS components via the control bus 122. The various components controlled by the CPU 108 via the control bus for handling the flow of data and information on bus 124 are all interconnected via the bus 124, as shown. The audio interface 126 permits communication with an analog radio interface and the platform interphone system 42 (See FIG. 3). The synchronous communications interface 128 provides the communications link between the CPU 108 and the digital encryption/radio interface 48 (also FIG. 3). An option 1553 bus interface 130 for use with the configuration shown in FIG. 4 is also provided. The RS-232 interface 132 provides communications links to the various RS232 devices such as the GPS receiver 40, the remote control unit 16, the platform computer 70, the video switching module 50, and the like. The RS-422 interface 134 is the link between the CPU 108 and the recorder/player component 12, other interfaces may be used. An optional LAN interface is also provided for supporting, by way of example, a LAN interfaced platform computer 70 as shown in FIG. 5. Video display logic is provided at 138 for supporting a CRT/VDU display device 21. The video frame capture device 140 supports the capture function directly from the video sources such as sensors A and B, thereby permitting video capture without interrupting the recorder 12. A "feature connector" interface allows full motion data between the Video Frame Capture input and the Video Display Logic. The optional MPEG compressor 142 provides the high speed interface for supporting full motion transmission via the high speed radio link 47 (see FIG. 3).

Figure 7:
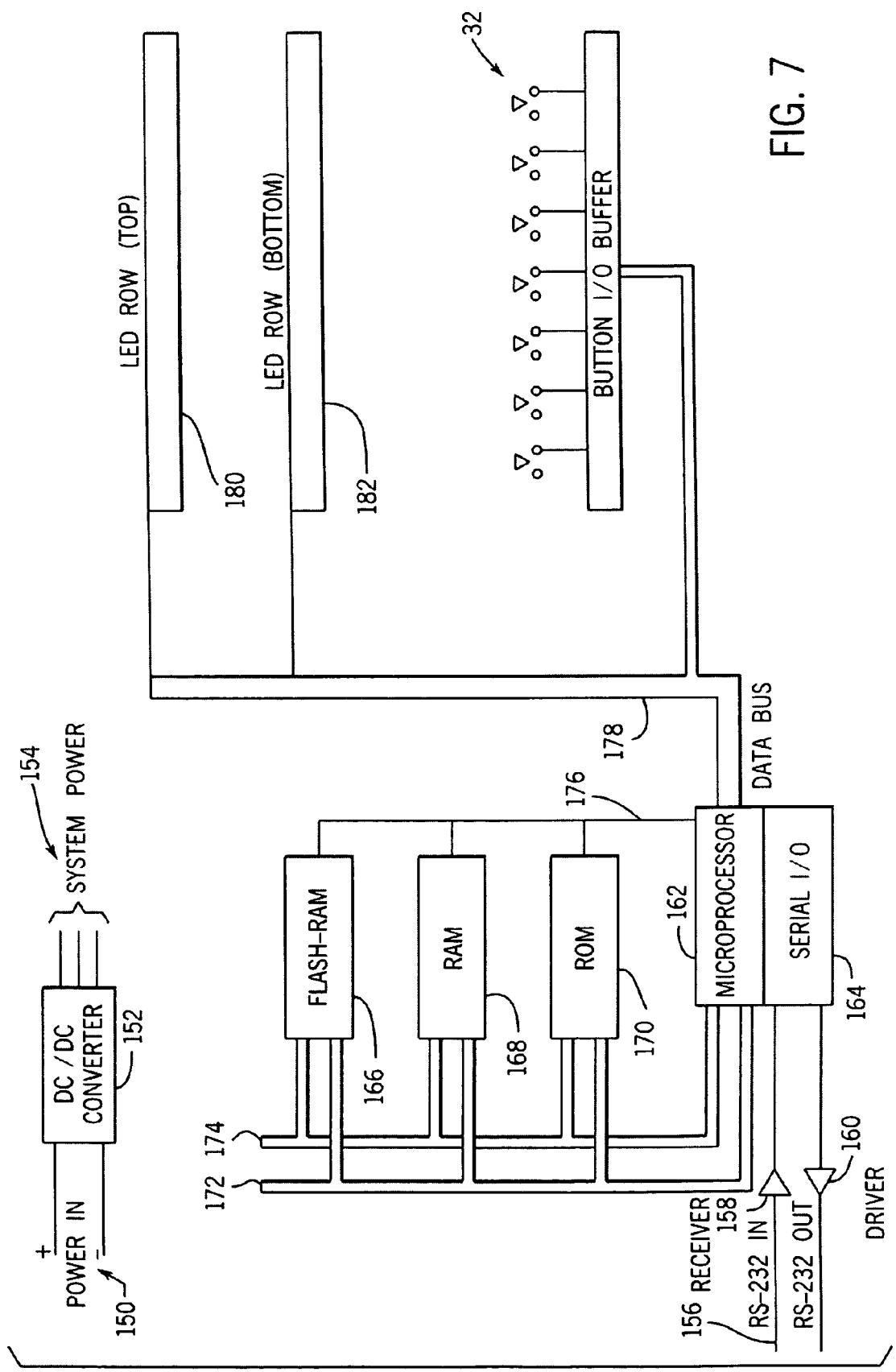
FIG. 7 is a block diagram of the remote control unit of the system.

A block diagram of the remote control unit 16 is shown in FIG. 7, the remote control unit. Is also powered by the platform power supply with a 28VDC power signal as shown at 150. The power signal is introduced to the DC/DC convertor 152 for providing system power at 14. The control signals from the system processor 10 are input and output on the RS-232 line 156 via the respective receiver 158 and driver 160. These signals are introduced into a microprocessor 162 via the serial input/output port 164. The microprocessor system includes a FLASH-RAM 166, a RAM 168 and a ROM 170, in communication with the microprocessor 162 via data bus 172, address bus 174 and control bus 176. A data bus 178 links the parallel display bars LED 180 and LED 182 with the microprocessor, and also links the various control buttons 32 with the microprocessor. In the preferred embodiment, the control buttons 32 are the input device for the system.

Figure 8:
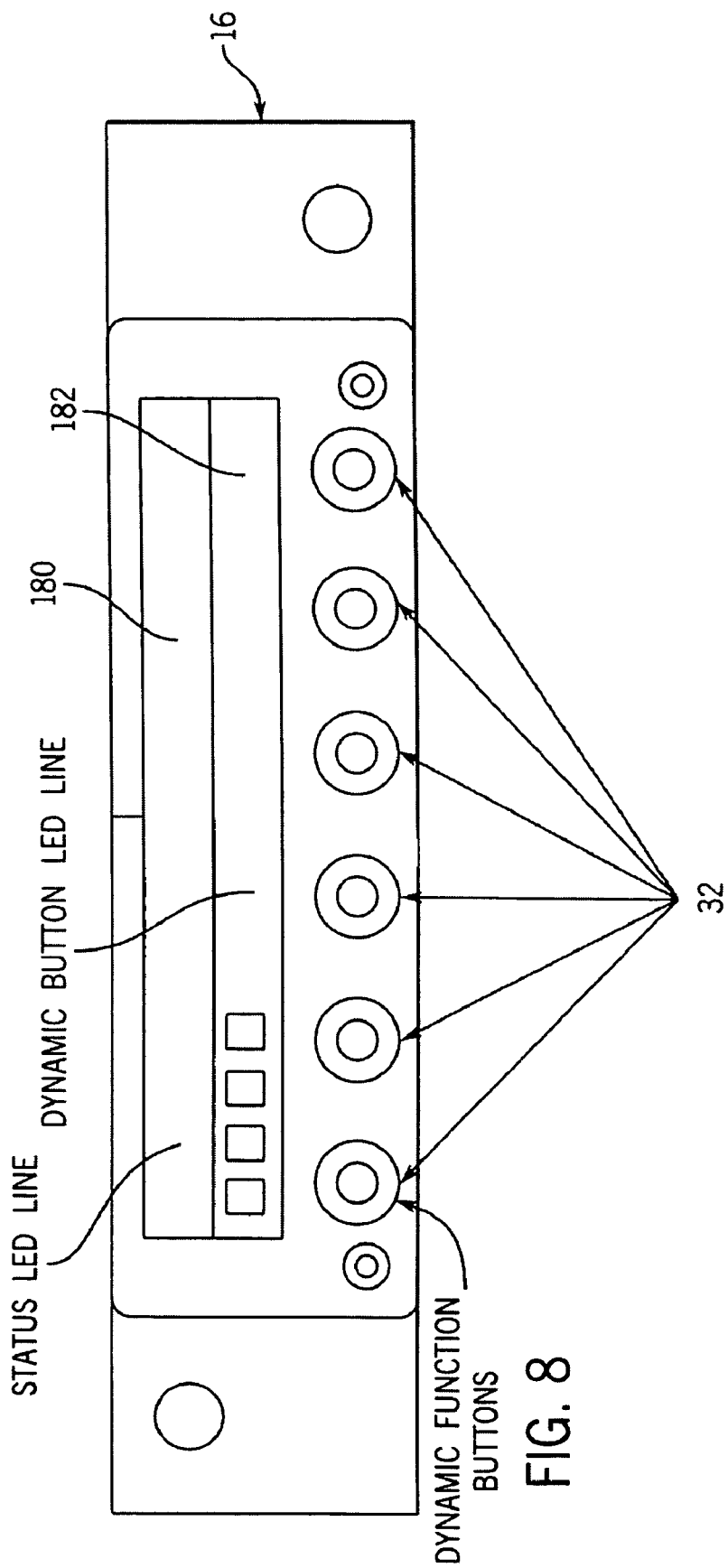
FIG. 8 is an enlarged view of the remote control unit shown in FIG. 2.

As better shown in FIG. 8 the control buttons 32 are dynamic function buttons located on the face of the remote control unit 16 in a row underneath the dual LED displays 180 and 182.

The function of each button is dynamic, i.e., the function changes based on the stat of the system and the user interface. The specific function is shown in the LED row and is positioned directly above the button. This method permits maximum versatility with a minimum number of buttons (Six in the preferred embodiment).

Figure 9:
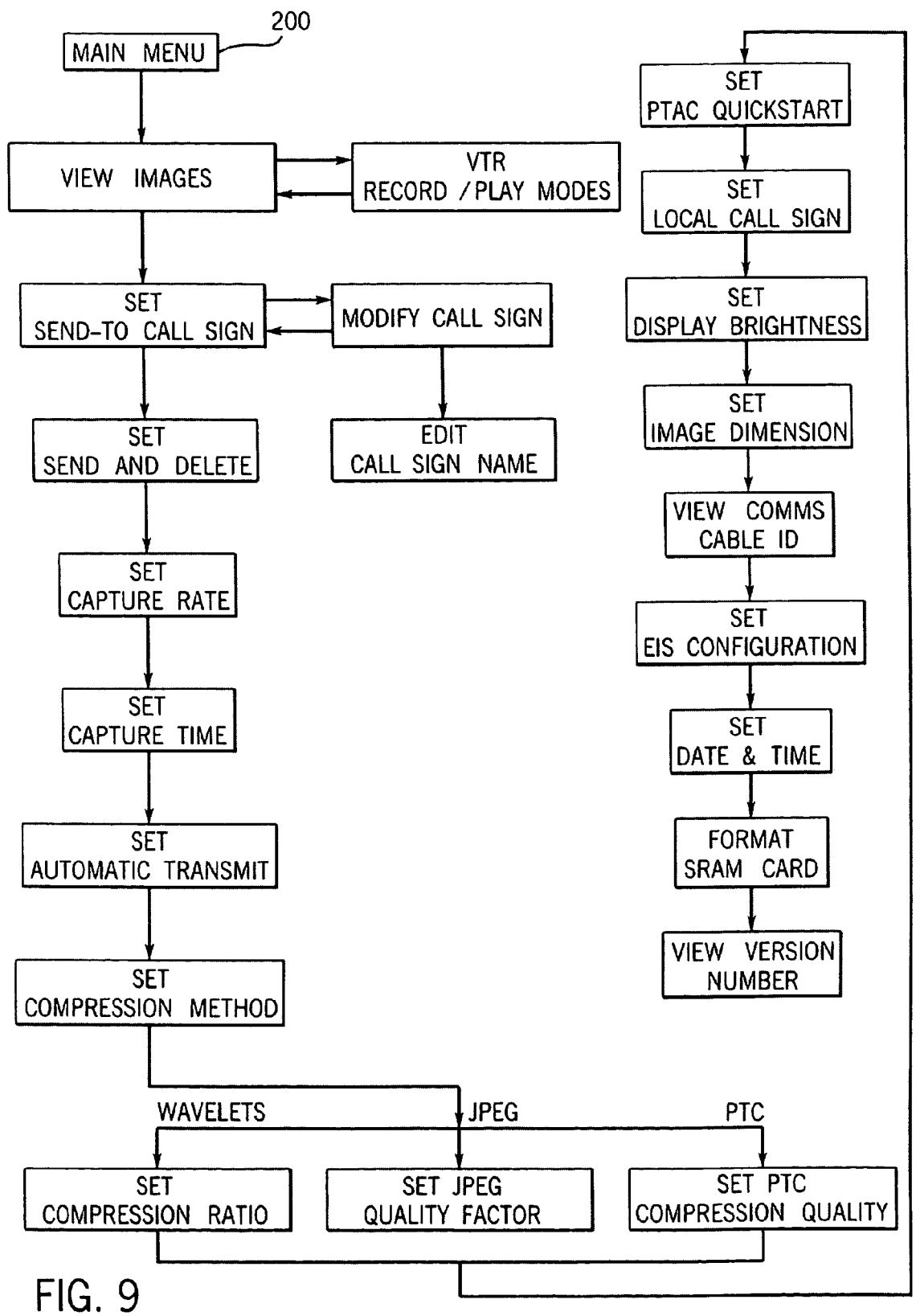
FIG. 9 is a menu flow chart for the system.

The versatility of the system is demonstrated by the menu commands utilized in the preferred embodiment, all accomplished with the six dynamic control buttons on the remote control unit 16:

Recorder/Player Commands & Summaries:
Standby (STOP)
Record
Play
Rewind
Fast Forward
Forward Search
Reverse Search
Unthread
Reset Counter
Event Mark
Recorder/Player Status (Message) Summary: Standby
Recording
Play
Rewind
Fast Forward
Scan Forward
Scan Reverse
Unthread
Counter (Hours:Minutes:Seconds)
End of Tape (EOM) Beginning of Tape (BOT)
Internal Error
Command Error
Communications Error Event Mark
Dew (Condensation)
Image Store/Transmission Command Summary: Send
Send and Delete
Set Send-to Call Sign Set Local Call Sign
Capture
Capture & Send
Set SNAP/BURST Mode
Set Burst
number
Set Burst
Interval
Review Image
Buffer Scroll
Forward
Scroll Reverse
Mark Image
Delete Image
Purge Buffer
Find Mark & Capture
Find Mark Capture and Send
Find All Marks & Capture
Find All Marks Capture & Send
Communications
Abort
Select Input "N"
View Recorder
View Input
View Processor
Select
Compression
Set
Resolution
Input Type (S-video, composite, other)
Image Store/Transmission Summary:
Sending to "XXXXX"
Receiving from "YYYYY"
Communications Error A flow chart of the menu capability is shown in FIG. 9, initiating at Main Menu 200. Each of the selections 15 accessed by activating the various dynamic button switches 32 (See FIGS. 2, 3 and 8). As indicated by the flow chart, the menu is scrolled through with the display shown in the parallel display bars LED 180 and LED 182 (FIG. 8). A more detailed menu/display correlation is shown in FIGS. 10*a*, 10*b* and 10*c*. Beginning at the Top Level Menu 202, reflecting the recorder state, the top display 180 shows various counter functions and the bottom display 182 illustrates the button function of the button switch 32 immediately below the display panel. As shown, the top level first position is the Record menu 204, the Play menu 206, the Standby menu 208 and the Unthread menu 210. This same display regimen is followed for each of the other Menu Levels which are activated as indicated in the drawing.

While certain features and embodiments of the invention have been described in detail to herein it will be readily understood that the invention encompasses all of modifications, enhancements and improvements within the scope of the following claims.

What is claimed is:

1. A multifunction remote controlled recording/playback system for recording full motion video signals comprising a series of sequential "still" frames, the recording/playback system comprising:

a. a recorder/player;
b. a central processing unit for controlling the recording/playback system;
c. a video signal source for providing a video signal;
d. a video signal transmission system;
e. a video signal switching system responsive to commands from the central processor unit for selectively distributing the video signal to the recorder/player, the display monitor and the transmission system, wherein a full motion video signal may be distributed to the recorder/player while a selected still frame of the video signal is distributed to other components of the system;
f. an audio signal source for providing an audio signal to the central processing unit for recording on the recorder/player unit; and
g. a data signal source for providing a data signal to the central processing unit for recording on the recorder/player unit.

2. The system of claim 1 wherein the data signal source comprises a GPS receiver.

3. The system of claim 1 wherein the audio signal source comprises an aircraft interphone.

4. The system of claim 1 further comprising an encryption unit for encrypting at least one signal.

5. Apparatus for receiving video from at least one video source, the video including a series of sequential still frames, the apparatus comprising:
   a processor, the processor being operable to receive the video, the processor being operable to output digital video, the processor being operable to output digital data representing a still frame;
   a control unit in communication with the processor, the control unit being operable to transmit to the processor at least one control signal;
   a digital recorder in communication with the processor, the digital recorder being adapted to receive the digital video from the processor, the digital recorder being adapted to store the digital video;
   a transmitter in communication with the processor, the transmitter being adapted to receive the digital data representing a still frame, the transmitter being in communication with a wireless recipient, the transmitter being adapted to transmit to the wireless recipient a wireless transmission embodying the digital data representing a still frame image; and
   the processor upon receiving the at least one control signal being operable to output for communication to the digital recorder the digital video, while the processor upon receiving said at least one control signal being operable to output for communication to the transmitter the digital data representing a still frame image.

6. Apparatus according to claim 5 and further comprising:
   a video player in communication with the processor, the video player being operable to play digital video received from the processor;
   the processor upon receiving at least one control signal being operable to output for communication to the video player the digital video.

7. Apparatus according to claim 5 and further comprising:
at least one of:
   an audio signal source in communication with the processor, the audio signal source providing to the processor an audio signal;
   a data signal source in communication with the processor, the data signal source providing to the processor a data signal;
   the processor upon receiving at least one of the audio signal and the data signal being operable to output for communication to the digital recorder the at least one of the audio signal and the data signal;
   the digital recorder being adapted to receive from the processor the at least one of the audio signal and the data signal, the digital recorder being adapted to store the at least one of the audio signal and the data signal.

8. Apparatus according to claim 7 and further comprising:
at least one connection suitable for receiving from a communications bus of a movable transport at least one of: the video, the audio signal, the data signal.

9. The system of claim 7 and further comprising:
wherein the data signal source includes a GPS receiver.

10. The system of claim 5 and further comprising:
wherein the audio signal source includes an aircraft interphone.

11. The system of claim 5 and further comprising:
an encryption unit for encrypting the wireless transmission.

12. A multifunction remote controlled recording/playback system for recording full motion video signals including a series of sequential "still" frames, the recording playback system comprising:
   a. a recorder/player unit;
   b. a central processing unit for controlling the recording/playback system;
   c. a video signal source for providing a video signal;
   d. a video signal transmission system; and
   e. a video signal switching system responsive to commands from the central processor unit for selectively distributing the video signal to the recorder/player, the display monitor and the transmission system, wherein a full motion video signal may be distributed to the recorder/player while a selected still frame of the video signal is distributed to other components of the system.

13. The system of claim 12 and further comprising:
an audio signal source for providing an audio signal to the central processing unit for recording on the recorder/player unit.

14. The system of claim 12 and further comprising:
a data signal source for providing a data signal to the central processing unit for recording on the recorder/player unit.

15. The system of claim 14 and further comprising:
wherein the data signal source including a GPS receiver.

16. The system of claim 13 and further comprising:
wherein the audio signal source including an aircraft interphone.

17. The system of claim 12 further comprising:
an encryption unit for encrypting at least one of the video signal, the data signal, the audio signal.

* * * * *